(12) United States Patent
Giardina et al.

(10) Patent No.: US 9,130,943 B1
(45) Date of Patent: Sep. 8, 2015

(54) MANAGING COMMUNICATIONS BETWEEN CLIENT APPLICATIONS AND APPLICATION RESOURCES OF ON-PREMISES AND CLOUD COMPUTING NODES

(71) Applicant: CA, Inc., Islandia, NY (US)

(72) Inventors: Nathan J. Giardina, San Diego, CA (US); Beau Croteau, Bay Shore, NY (US); David S. Tyree, Denver, CO (US); Robert Hucik, Simi Valley, CA (US)

(73) Assignee: CA, Inc., New York, NY (US)

( * ) Notice: Subject to any disclaimer, the term of this patent is extended or adjusted under 35 U.S.C. 154(b) by 278 days.

(21) Appl. No.: 13/793,732

(22) Filed: Mar. 11, 2013

(51) Int. Cl.
*G06F 15/173* (2006.01)
*H04L 29/08* (2006.01)

(52) U.S. Cl.
CPC ..................................... *H04L 67/10* (2013.01)

(58) Field of Classification Search
CPC .......................... H04L 29/08072; H04L 67/10
USPC ................................................. 709/226, 203
See application file for complete search history.

(56) References Cited

U.S. PATENT DOCUMENTS

| | | | | |
|---|---|---|---|---|
| 7,243,366 | B2 * | 7/2007 | Medvinsky et al. | 726/2 |
| 7,987,509 | B2 * | 7/2011 | Feigenbaum et al. | 726/26 |
| 8,041,942 | B2 * | 10/2011 | Narayanan et al. | 713/156 |
| 8,463,781 | B1 * | 6/2013 | Raz et al. | 707/736 |
| 8,572,410 | B1 * | 10/2013 | Tkacik et al. | 713/193 |
| 2003/0158947 | A1 * | 8/2003 | Bloch et al. | 709/227 |
| 2003/0177225 | A1 * | 9/2003 | Brown et al. | 709/224 |
| 2007/0174614 | A1 * | 7/2007 | Duane et al. | 713/168 |
| 2010/0172504 | A1 * | 7/2010 | Allen et al. | 380/286 |
| 2011/0258326 | A1 * | 10/2011 | Hu et al. | 709/226 |
| 2011/0307523 | A1 * | 12/2011 | Balani et al. | 707/802 |
| 2012/0042061 | A1 * | 2/2012 | Ayala et al. | 709/224 |
| 2013/0290539 | A1 * | 10/2013 | Kodialam et al. | 709/226 |
| 2013/0304923 | A1 * | 11/2013 | Clay et al. | 709/226 |
| 2013/0326533 | A1 * | 12/2013 | Ito et al. | 718/104 |
| 2014/0068078 | A1 * | 3/2014 | Hiremane | 709/226 |
| 2014/0089510 | A1 * | 3/2014 | Hao et al. | 709/226 |

OTHER PUBLICATIONS

Andrzejak et al., "Exploiting non-dedicated resources for cloud computing," Network Operations and Management Symposium (NOMS), 2010 IEEE , vol., no., pp. 341,348, Apr. 19-23, 2010 doi: 10.1109/NOMS.2010.5488488.*

* cited by examiner

*Primary Examiner* — Kostas Katsikis
(74) *Attorney, Agent, or Firm* — Myers Bigel Sibley & Sajovec, P.A.

(57) ABSTRACT

A computer program products are disclosed that include computer readable program code embodied in a computer readable storage medium. The computer readable program code communicates with a plurality of nodes to determine network addresses of application resources of the plurality of nodes and capabilities of the application resources. The computer readable program code associates application keys to the network addresses, and communicates one of the application keys and associated application resource capability to a client application. The computer readable program code receives a communication from the client application containing the one of the application keys, translates the one of the application keys to an associated one of the network addresses, and forwards the communication to the application resource having the associated one of the network addresses.

22 Claims, 6 Drawing Sheets

__US 9,130,943 B1__

MANAGING COMMUNICATIONS BETWEEN CLIENT APPLICATIONS AND APPLICATION RESOURCES OF ON-PREMISES AND CLOUD COMPUTING NODES

BACKGROUND

The present disclosure relates generally to software applications for managing application resources of on-premises and cloud computing nodes that are used by client applications.

Cloud computing enables applications to execute on any number or arrangement of computer network nodes. Cloud computer systems may include servers, network storage devices, routers, gateways, communication links, software (e.g., applications, operating systems, web services, etc.), and other devices. In a typical cloud computer environment, applications may be executed on virtual machines or appliances, which are isolated guest operating systems installed within a host system and optional preset configuration and structure (e.g., combination of operating system and web server). Virtual machines are typically implemented with software emulation, hardware virtualization, or both. A single hardware and/or software platform may host a number of virtual machines, each of which may have access to some portion of the platform's resources, such as program code processing resources, storage resources, display resources, communication interfaces, etc.

Some cloud computer systems allow a client or administrator to request a network node for use in executing an application. However, to make this request a client/administrator needs to be aware of the network configuration for the node, such as by knowing the internet protocol (IP) address or domain name service (DNS) name of the node. For example, FIG. 1 shows a network cloud 102 with multiple servers labeled node 1 to node 5 (110-150). A user node interface 160, which may reside on the user's computer node, operates to identify the node(s) by their IP address(es) or DNS name(s) and providing commands to cause the node(s) to install and execute an application. Configuring the user node interface 160 to operate in this manner adds a level of complexity for users.

BRIEF SUMMARY

Some embodiments are directed to a computer program product that includes computer readable program code embodied in a computer readable storage medium. The computer readable program code communicates with a plurality of nodes to determine network addresses of application resources of the plurality of nodes and capabilities of the application resources. The computer readable program code associates application keys to the network addresses, and communicates one of the application keys and associated application resource capability to a client application. The computer readable program code receives a communication from the client application containing the one of the application keys, translates the one of the application keys to an associated one of the network addresses, and forwards the communication to the application resource having the associated one of the network addresses.

The computer readable program code may track changes in the application resources capabilities responsive to self-reporting by the application resources and/or by repetitively querying the application resources.

The computer readable program code may allocate a plurality of application resources for use by the client application. The capabilities of the application resources can be compared to resource needs of the client application, and a plurality of the application resources can be allocated for use by the client application responsive to the comparison.

These and other related methods, systems and computer program products are disclosed herein.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Aspects of the present disclosure are illustrated by way of example and are not limited by the accompanying figures, in which like references indicating like elements.

DETAILED DESCRIPTION

Figure 1:
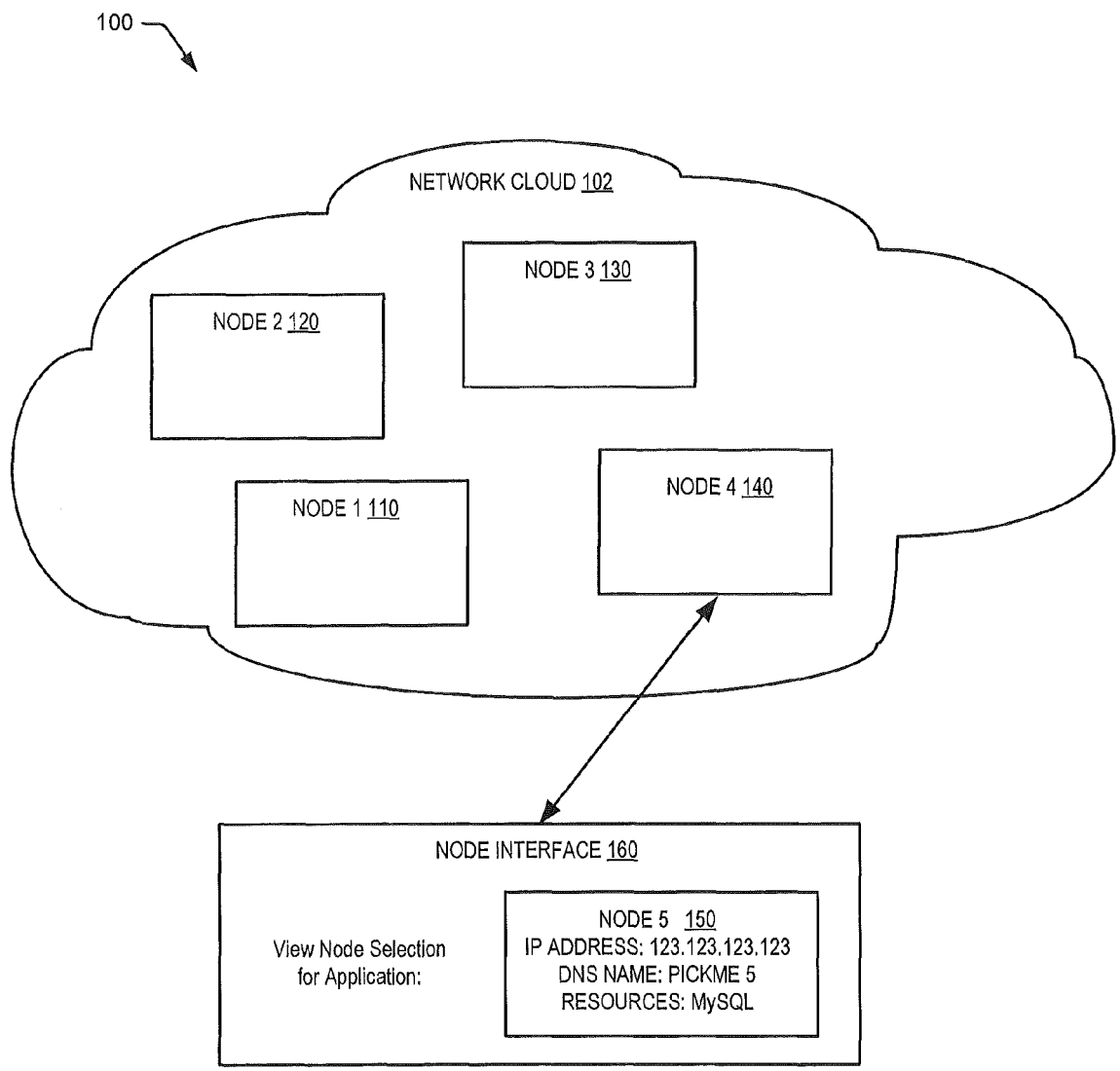
FIG. 1 illustrates a system for selecting a node for an application.

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Existing cloud environments require a network configuration, such as an IP address or DNS name of a node, to be specified in order to proceed with installation or execution of an application on the specified node. This is an extra level of complexity that is placed on a client application or system administrator. A user may have an application in mind and would just like a straightforward way to execute the application within a large and dynamic network of resources in the cloud.

Some of the above drawbacks may be overcome by some systems of the present disclosure that provide a network of agents which operate to discover application resources and associated capabilities that can be used by a client application. An agent on one node can identify application resources and associated capabilities residing on that node and, moreover, identify application resources and associated capabilities on other nodes via one or more networks. An agent responds to itself coming online (e.g., startup) by determining the network addresses of application resources of its node, and by communicating with other nodes to determine the network addresses of application resources of the other nodes and capabilities of the application resources. Agents may bootstrap themselves from one node to other nodes to proliferate themselves across the nodes to provide a network of agents which cooperatively perform discovery of application resource capabilities. The agents may provide a common user interface through which a client application and/or client may interact to discover, use, and manage application resources across all of the nodes.

Each node can include a similarly or identical agent configured to identify application resources across a "hybrid-cloud" which can span both networked nodes within the cloud (e.g., cloud servers) and on-premises nodes (e.g., servers) using one or more networks (e.g., public/private networks, secure/unsecure networks, wired/wireless networks, etc). An on-premises server may be directly connected to a private network within a client's premises. The agent can manage communications between client applications and application resources residing on on-premises nodes and cloud based nodes so that the address locations of the nodes is transparent to the communication endpoints.

These agents can determine what software application resources and/or hardware application resources are on their individual node machines. The application resources can include, but are not limited to, databases, webservers, data storage applications, data archiving applications, data routing applications, etc. These agents also determine the capabilities of the application resources. The application capabilities may, for example, correspond to a particular brand of application resource (e.g., MySQL type database, Redis type data store, Ruby type programming language, etc.) and/or correspond to a configuration of application resource (e.g., available application programming interfaces, available libraries, available data stores, number of client licenses available for use, application execution constraints, etc.).

The agent uses its knowledge of what application resources and associated capabilities are needed to support execution of a client application and its knowledge of the available application resources and associated capabilities of the nodes, to install/execute a client application on one or more of those nodes and to communicatively interface the client application with one or more of the needed application resources. The client application may, for example, correspond to one or more applications that reside on client equipment and/or one or more applications that a client identifies for execution. The agent can thereby manage assignment of application resources for use by client applications, and can do so according to one or more defined resource management schemes (e.g., fair-balanced scheme, tiered client prioritization, etc.).

A client application and application resources that are needed by the client application for operation can be chosen for installation or execution on nodes of the network cloud 102. No network configuration is required in a request for application resources to install or execute the client application. An application resource management agent is aware of the application resources and associated capabilities of nodes and will select one or more application resources of one or more nodes for use by the client application based on known requirements of the client application. When selecting the application resources for use by the client application, the application resource management agent may furthermore make the selection decisions based on quality of service that can be provided by the application resources (e.g., performance attributes of the application resources, present performance measurements of the application resources, response latency, etc.), available capacity of the resources (present resource utilization/load), geographic location of the client application and/or the application resources, and/or availability of other application resources at other locations. The application resource selection process by the application resource management agent is not limited to these particular example embodiments, and may additionally or alternatively be based on other attributes or rules that are observable or enumerated at installation or execution time.

The agents can maintain their own DNS to allow for automatic failover and scaling. The agents can also create new virtual machines on a server node and new server nodes when needed, and bootstrap further agents onto the new virtual machines without requiring client interventions. By generating new server nodes having desired application resources, the agents can scale the available application resources to satisfy client applications' needs. The agents may additionally/alternatively increase the reliability and availability of application resources by responding to failure or insufficient quality of service of one or more applications resources and/or one or more server nodes by switching over (failover) to application resources on new server nodes, and may do so relatively instantly/quickly and transparently to the client applications.

All the agents may provide a client interface (UI) for interfacing with a client application and/or with the client, and may provide common UI operational functionality for interfacing clients and client applications with associated application resources. Application resources can be managed (e.g., created, installed, removed, backed-up, quality of service monitored and/or controlled, etc.) in a consistent manner using the common UI. Creation of client applications and associated application resources can be done by a custom visual UI that allows for an intuitive installation and configuration of client applications and associated application resources, mostly regardless of underlying technology. Client applications and associated application resources can be installed and scaled manually or automatically (without client intervention) based on application resources needs, performance requirements and/or costs.

Figure 2:
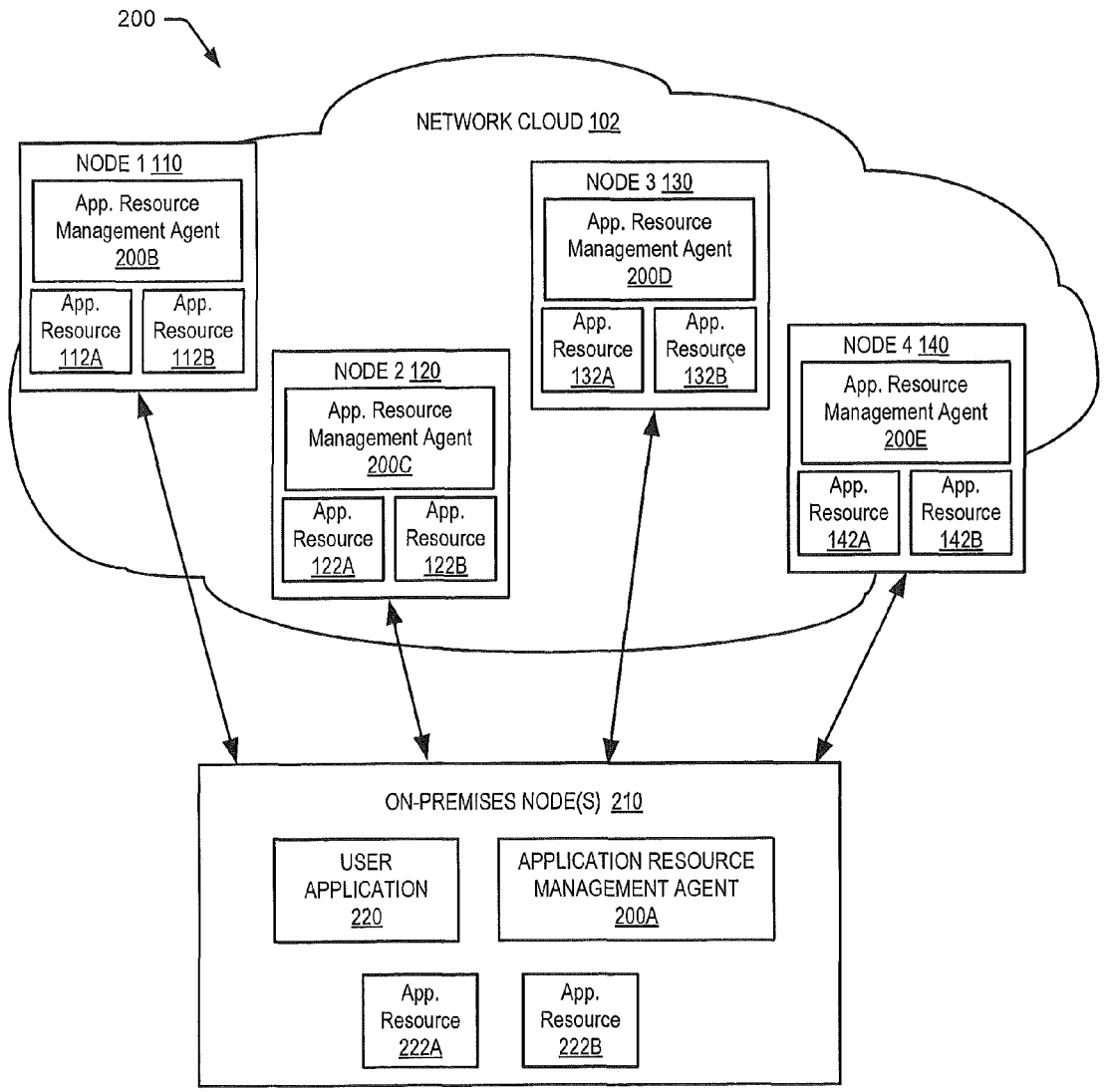
FIG. 2 illustrates a system for selecting application resources of on-premises nodes and network cloud nodes, according to an embodiment.

FIG. 2 illustrates an example system 200 of a computing environment that includes on-premises node(s) 210 and nodes 110, 120, 130, 140 in a network cloud 102. The nodes 210, 110, 120, 130, 140 may include any combination of computing devices, including, but not limited to servers, mainframe, personal computer (PC), handheld computers, mobile computers, tablet, laptops, set top boxes, game consoles or any other appropriate computer program execution devices. Such computing devices may include computing resources such as a central processing unit (CPU); networking controllers; communication controllers; a display unit; a program and data storage device; memory controllers; input devices (such as a keyboard, a mouse, etc.) and output devices such as printers. The CPU may be any general purpose processor and/or special purpose processor (e.g., microprocessor and/or digital signal processor) that may be collocated (e.g., within a same circuit package, connected to a same backplane, enclosed within a same computer housing, etc) or distributed across one or more data networks.

Network cloud 102 shows nodes 1-3 (110, 120, 130, 140). Although some embodiments of nodes 1-3 may be configured to operate as a computer server, nodes 1-3 are not limited thereto and can be configured to provide other functionality, such as data processing, data storage, data archiving, data communications routing, etc. Nodes 1-3 may be a portion of the network cloud 102 or the entire network cloud 102. Nodes 1-3 may be securely associated with one another through a virtual private network (VPN) or any other grouping or configuration that identifies the nodes as available resources to a client.

Nodes 1-3 are communicatively coupled in network cloud 102, which may be part of a larger communicate network. Network cloud 102 facilitates wireless or wired communication, and may communicate using, for example, IP packets, Frame Relay frames, Asynchronous Transfer Mode (ATM) cells, voice, video, data, and other suitable information between network addresses. Network cloud 102 may include one or more local area networks (LANs), radio access networks (RANs), metropolitan area networks (MANS), wide area networks (WANs), a portion of the global computer network known as the Internet, and/or any other communication system or systems at one or more locations.

In the embodiment of FIG. 2, each of the nodes (210, 110, 120, 130, 140) includes an application resource management agent 200A-E. Each of the agents 200A-E can operate to identify application resources and associated capabilities provided on a local node of the respective agent and can furthermore identify application resources and associated capabilities provided on the other nodes. The nodes (210, 110, 120, 130, 140) may have the same or different application resources. For example, as shown in FIG. 1, node 1 contains application resources 112A-B, node 2 contains application resources 122A-B, node 3 contains application resources 132A-B, node 4 contains application resources 142A-B, and the on-premises node 210 includes application resources 222A-B.

Examples of such capabilities of application resources may include, but are not limited to open source or proprietary databases, port configurations, and software implementations such as application servers, web servers or other related software for creating server instances. Capabilities may also include, but are not limited to, hardware features and functionality, CPU architecture, operating system versions, available resources such as disk space, physical or virtual processing power, available memory, network connectivity, client names, client specific applications, databases, software functionality and/or versions, quality of service (QoS) metrics, and port configurations. Some identified application resource capabilities may signify other application resource capabilities for other applications that are operationally linked thereto. For example, an open TCP/IP port, such as port 3306, may signify a certain type of database, such as a MySQL® database, is available on the node for web applications. In another example, if a server has Java® and the tomcat-create-instance executable, it can be considered to have node attributes corresponding to a capability for Tomcat® software.

The nodes 110-140 and 120 may execute application resources on virtual machines, which are isolated guest operating systems installed within a host system. Virtual machines may be implemented with software emulation, hardware virtualization, or both. A single hardware and/or software platform may host a number of virtual machines, each of which may have access to some portion of the platform's resources, such as program code processing resources, storage resources, display resources, communication interfaces, etc. The computing needs of clients and/or other virtual/non-virtual machines drive the functionality of the managed machines. A virtual hypervisor can provide an interface between the managed machines and a host operating system and allow multiple guest operating systems and associated applications to run concurrently. The host operating system handles the operations of a hardware platform capable of implementing managed machines. The virtual hypervisor virtualizes the computer system resources and facilitates the operation of the managed machines. The virtual hypervisor can intercept communications and actions by the guest operating system.

Figure 3:
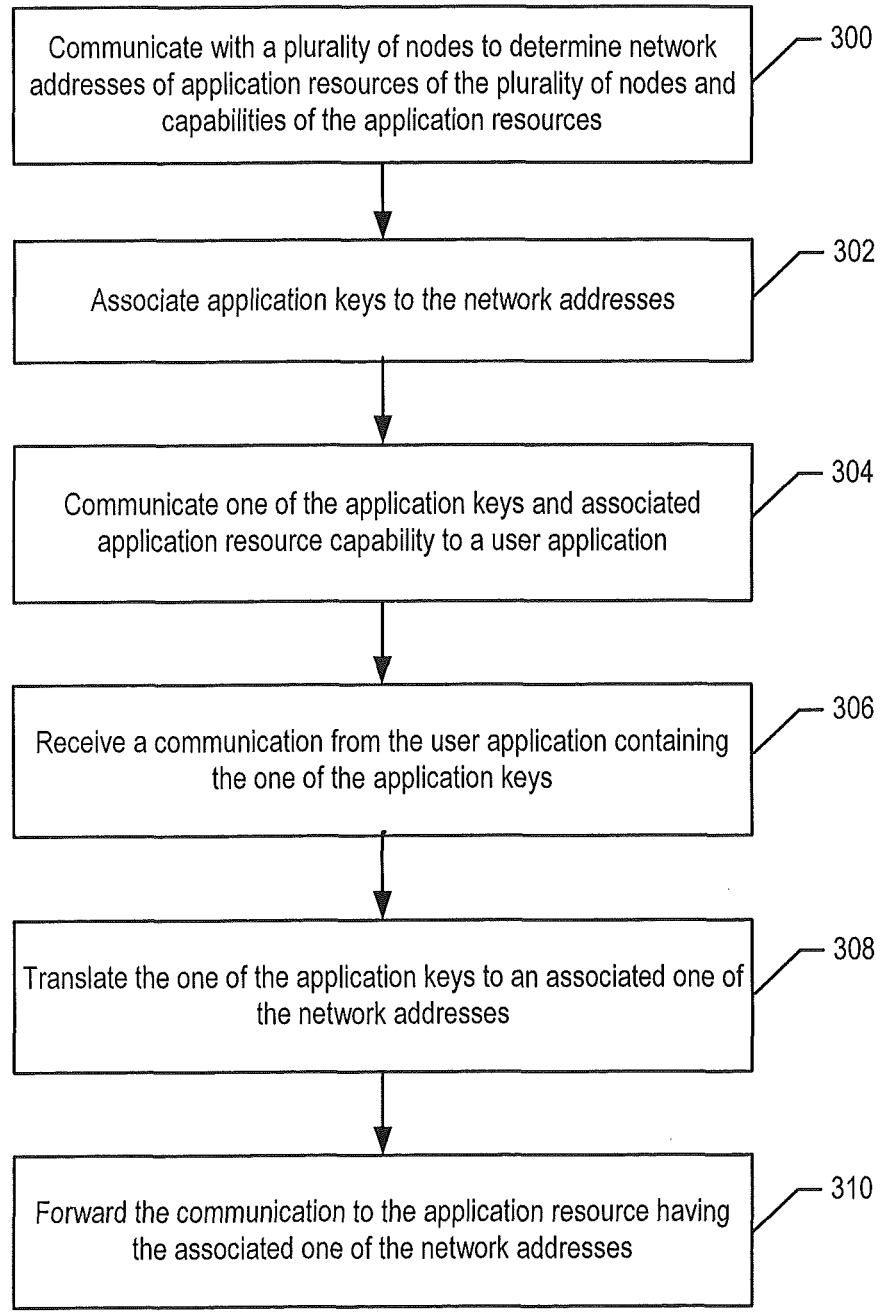
FIG. 3 illustrates a process flowchart for discovering application resources and capabilities, and providing address translation between a client application and one or more application resources, according to an embodiment.

The agents 200A-E may operate to provide address translations (such as domain name system (DNS) services and reverse-DNS services) for communications between application resources and/or between the application client application 220 and the application resources. FIG. 3 illustrates a process flowchart for discovering application resources and capabilities, and providing address translation between client application and one or more application resources. Referring to FIG. 3, an application resource management agent 200A of node 210 or other computer readable program code communicates (block 300) with the application resource management agents 200B-E of the other nodes 110, 120, 130, 140 to determine network addresses of their application resources and capabilities of the application resources. The application resource management agent 200A associates (block 302) application keys to the network addresses, and communicates (block 304) one of the application keys and associated application resource capability to a client application 220. The application resource management agent 200A receives (block 306) a communication from the client application 220 containing the one of the application keys, translates (block 308) the one of the application keys to an associated one of the network addresses, and forwards (block 310) the communication to the application resource having the associated one of the network addresses.

Is still further embodiments, each of the application resource management agents 200A-E can provide a multicast domain name system (mDNS) mechanism to enable communications between application resources and the client application 220 to occur transparently to their present physical machine network address and/or virtual machine network address. An agent can send a multicast domain name system query message to the agents of nodes to learn the network addresses of application resources and associated capabilities on those nodes. The agent(s) can also broadcast information identifying network addresses of its application resources and capabilities of the application resources to the other agents on the other nodes. The agents can thereby be aware of changes that have occurred as application resources are created, changed, terminated on the other nodes.

Because the client application 220 is made aware of the application keys and not the network addresses of the application resources, an agent can change which application resources are made available for use by the client application 220 by changing which network address(es) of application resources are associated with an application key(s) provided to the client application 220 and without the client application 220 being aware of the changes. Applications resources may thereby be dynamically created, moved between physical nodes and/or virtual machine nodes and/or replaced by other application resources without awareness of the client application 220.

In one embodiment, the application resource management agent 200A can track changes in the application capabilities responsive to self-reporting by the application resources, such as via the application resource management agents 200B-E. The agent 200A can identify a change in capabilities of one of the application resources responsive to the capability update messages, and can update application capability information that resides in a repository responsive to the identified change. When a report is not received within a defined time period of the previous report, the associated application resource can be removed from a list of available application resources to reflect that the application resource may no longer be operational/available.

For example, the application resource management agent 200A may receive capability update messages from the application resources (e.g., 112A-B, 122A-B, 132A-B, 142A-B), such as via the other application resource management agents 200B-E. The agent 200A can use the capability update messages to update a repository of information that indicates the presently available application resources and their present capabilities. The application resource management agent 200A can remove one of the application resources from a repository listing available application resources responsive to not receiving a capability update message from the one of the application resources for at least a threshold time since a last receipt of a capability update message from the one of the application resources. In this manner, the agents may dynamically track changes in capabilities and availability of the application resources, and can use that information to manage allocation of application resources for use by the client application 220.

The agent 200A may define the duration of the threshold time for one of the application resources responsive to an attribute of the capability of the application resource. Some application resources may thereby have higher rate reporting requirements than other application resources in order to remain among a list of available application resources for use by the client application 220.

Additionally or alternatively, the application resource management agent(s) 200A-E can track changes in the application capabilities by repetitively querying the application resources (e.g., 112A-B, 122A-B, 132A-B, 142A-B), such as via the application resource management agent 200B-E. Queries may be performed periodically, a periodically, or responsive to occurrence of defined events. Queries may be directed in a general broadcast to all associated nodes or direct to a specific node or specific set of nodes. Queries may request all node application resources of all nodes, one or more specific application resources of one or more specific nodes, or specific capabilities of one or more application resources of one or more specific nodes. The agent agent(s) 200A-E can update local and/or centralized repository(ies) of information, which indicate the presently available application resources and their present capabilities, based on the tracked changes.

Node application resource capabilities may be broadcast when a node changes its application resource capabilities. In other embodiments, a new node entering network cloud 102 broadcasts its application resource capabilities upon arrival or inclusion in the nodes available for selection by the application resource management agents.

Figure 4:
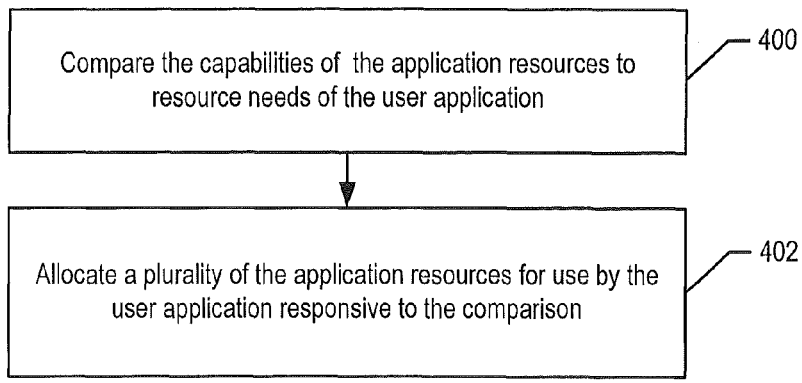
FIG. 4 illustrates a process flowchart for allocating a plurality of the application resources for use by a client application, according to an embodiment.
Figure 7:
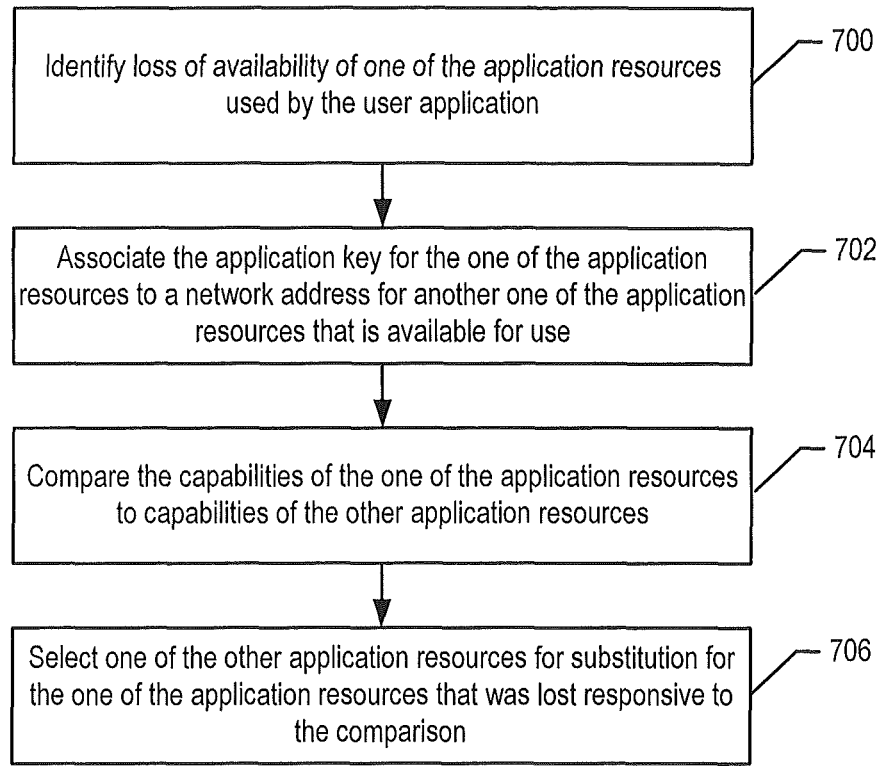
FIG. 7 illustrates a process flowchart for responding to loss of an application resource used by the client application, by remapping the application key to the address of another application resource, according to an embodiment.

The application resource management agent(s) 200A-E can allocate a plurality of the application resources (e.g., 112A-B, 122A-B, 132A-B, 142A-B, 222A-B) for use by the client application 220, such as according to the process flowchart of FIG. 4. Referring to FIG. 4, the capabilities of the application resources are compared (block 400) to the resource needs of the client application 220. A plurality of application resources are allocated (block 402), also referred to as linked, for use by the client application responsive to the comparison. A node linked to the target application is selected (FIG. 7 block 708). An application resource that is selected may be selected based on a number of factors, including but not limited to, CPU availability, memory availability, physical location, virtual machine configuration, IP addresses, software version, or other optimization considerations. Application resource selection may also be sequential or random. Application resource selection may not be limited to a single node and may include multiple nodes.

Allocation of an application resource for use by the client application 220 may cause the application resource to be installed on a node or installed to some degree on the node, and result in execution of the application resource on the node. In other cases, allocation of an application resource may result in installation, back up, restoring, starting, stopping, removal of the application resource on the selected node or any other application lifecycle events. The selected application resource, having been determined to be linked to a client application, can be operated as necessary to ensure that the client application can perform desired/necessary functionality to a client.

According to some embodiments, Redis™ data stores may be used as a repository of available application resources and capabilities. Knife™ command tools may be used to create nodes and Chef™ software may be used to install the functionality of application resource management agents on a computing device or node. Node.js® software may be used to implement these node agents. In yet another embodiment, RESTful APIs are used for internode connections.

Figure 5:
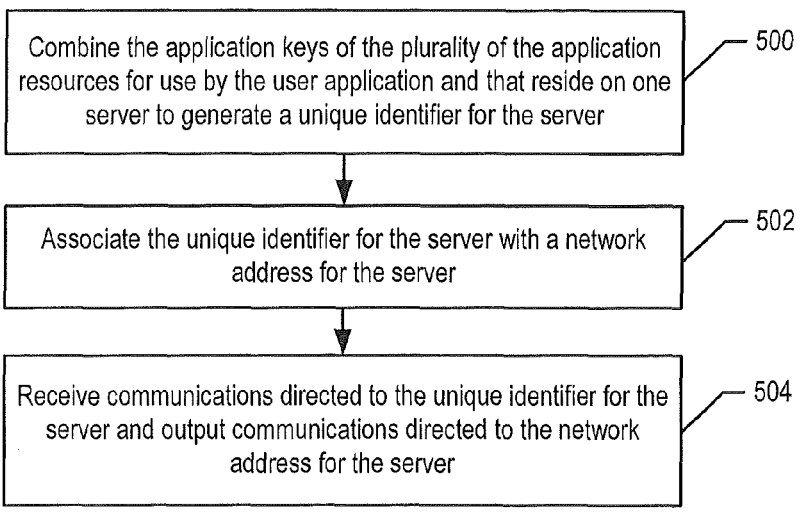
FIG. 5 illustrates a process flowchart for combining the application keys for a plurality of application resources, which are linked together for use by a client application, to generate an application key, according to an embodiment.

The application resource management agent(s) 200A-E can combine the application keys for a plurality of application resources, which are linked together for use by a client application, to generate an application key. Accordingly, one or more of the agents 200A-E can use the application key to identify a plurality of resources that are allocated for use by the client application 220. Referring to the example process flowchart of FIG. 5, application keys of the plurality of the application resources for use by the client application 220 and that reside on one server node, are combined (block 500) to generate a unique identifier for the server node. The unique identifier for the server node is associated (block 502) with a network address for the server node. The application resource management agent(s) 200A-E can then receive communications that are directed to the unique identifier for the server, and output (block 504) communications that are directed to the network address for the server.

This address translation capability by the agent can enable communications to occur between the client application 220 and a plurality of application resources without the client application 220 being required to know the network addresses of each of the application resources and, moreover, without being made aware of changes to the network addresses of application resources that have been added for use by the client application 220 and/or that have been substituted for one or more application resources for use by the client application 220.

Figure 6:
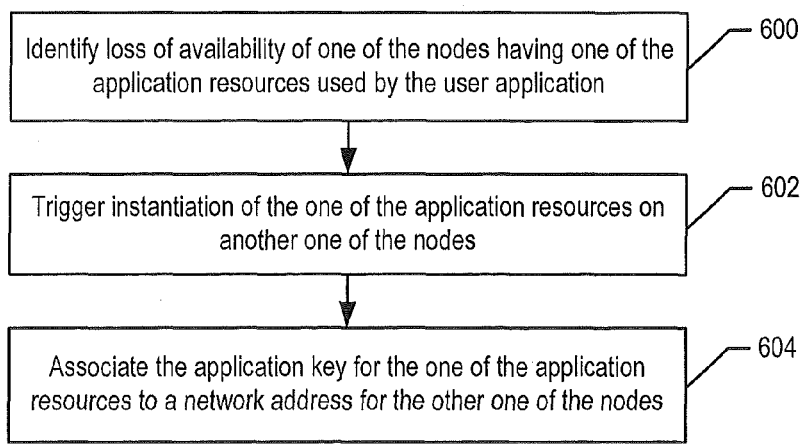
FIG. 6 illustrates a process flowchart for responding to loss of a node by instantiating an application resource that was on the lost node to another node, and remapping the application key to the address of the other node, according to an embodiment.

The application resource management agent(s) 200A-E can respond to loss of a node by instantiating an application resource that was on the lost node to another node, and remapping the application key to the address of the other node. Referring to the example process flowchart of FIG. 6, the loss of availability of one of the nodes having one of the application resources used by the client application is identified (block 600). Instantiation of the one of the application resources on another one of the nodes is triggered (block 602) responsive to the identification (block 600). The application key for the one of the application resources is associated (block 604) to a network address for the other one of the nodes.

The application resource management agent(s) 200A-E can respond to loss of an application resource used by the client application, by remapping the application key to the address of another application resource. Referring to the example process flowchart of FIG. 7, the loss of availability of one of the application resources used by the client application is identified (block 700). The application key for the one of the application resources is associated (block 702) to a network address for another one of the application resources that is available for use. Accordingly, loss of an application resource can trigger identification of another application resource that can be used in place of the lost application resource to support operation of the client application.

To identify the other application resource that will be used in place of a lost application resource, the capabilities of the one of the application resources that was lost can be compared (block 704) to capabilities of the other application resources, and one of the other application resources can be selected (block 706), for substitution for the one of the application resources that was lost, responsive to the comparison.

Figure 8:
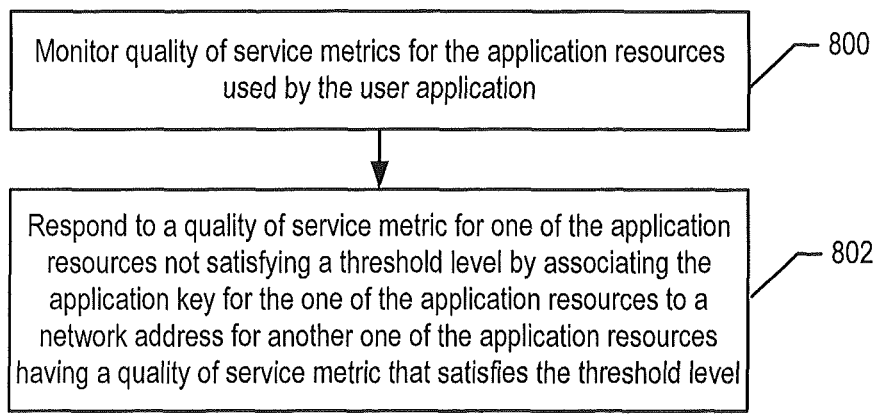
FIG. 8 illustrates a process flowchart for monitoring quality of service for application resources that are used by a client application, and responding to changes in the quality of service by managing which application resources are used by the client application, according to an embodiment.

The application resource management agent(s) 200A-E can monitor quality of service for the application resources that are used by the client application 220, and can respond to changes in the quality of service by managing which application resources are used by the client application 220. Referring to the example process flowchart of FIG. 8, the agent(s) can monitor (block 800) quality of service metrics for the application resources used by the client application, and can respond to a quality of service metric for one of the application resources not satisfying a threshold level by associating (block 802) the application key for the one of the application resources to a network address for another one of the application resources having a quality of service metric that satisfies the threshold level.

The agent(s) may determine the quality of service metrics for the application resources based on response latencies of the application resources, based on occurrence of execution errors with the application resources, and/or based on other observable parameters that indicate whether the application resources are functioning properly and/or their performance level for use with a client application. The quality of service metrics may be determined in a manner that is transparent to operation of the application resources.

As explained above, agents may bootstrap themselves from one node to other nodes to proliferate themselves across the nodes to provide a network of agents which cooperatively provide discovery of application resource capabilities. A first application resource management agent can discover a node that is newly available for use by the client application, and can load a second application resource management agent containing a copy of the computer readable product of the first application resource management agent onto the node that is newly available.

As will be appreciated by one of skill in the art, aspects of the disclosure may be embodied as a method, data processing system, and/or computer program product. Furthermore, embodiments may take the form of a computer program product on a tangible computer readable storage medium having computer program code embodied in the medium that can be executed by a computing node.

Figure 9:
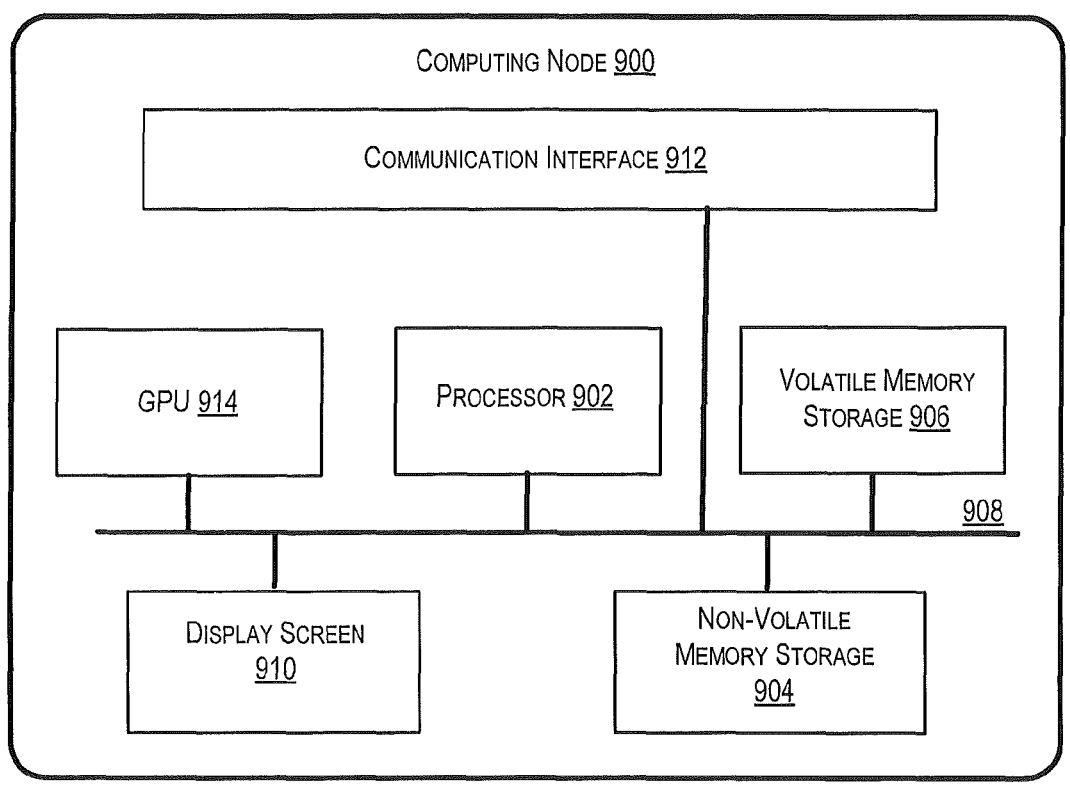
FIG. 9 is a block diagram of a computing device in which embodiments can be implemented.

FIG. 9 is an example computing node 900 in which embodiments of the present disclosure, or portions thereof, may be implemented as computer-readable code. For example, the components of nodes 110-140 and 210 or any other apparatus and methods disclosed herein, including the operations and methods of FIGS. 2-8 may be implemented in one or more computing nodes 900 using hardware, software implemented with hardware, firmware, tangible computer-readable storage media having instructions stored thereon, or a combination thereof and may be implemented in one or more computer systems or other processing systems.

Computing node 900 may include one or more processors 902, one or more non-volatile storage mediums 904, one or more memory devices 906, a communication infrastructure 908, a display screen 910, a communication interface 912, and graphics processing unit (GPU) 914. Computing node 900 may also have networking or communication controllers, input devices (keyboard, a mouse, touch screen, etc.) and output devices (printer or display).

Processor(s) 902 are configured to execute computer program code from memory devices 904 and 906 to perform at least some of the operations and methods described herein, and may be any conventional or special purpose processor, including, but not limited to, digital signal processor (DSP), field programmable gate array (FPGA), application specific integrated circuit (ASIC), and multi-core processors. GPU 914 is a specialized processor that executes instructions and programs, selected for complex graphics and mathematical operations, in parallel.

Non-volatile storage 904 may include one or more of a hard disk drive, flash memory, and like devices that may store computer program instructions and data on computer-readable media. One or more of non-volatile storage device 904 may be a removable storage device. Memory devices 906 may include one or more volatile memory devices such as but not limited to, random access memory. Communication infrastructure 908 may include one or more device interconnection buses such as Ethernet, Peripheral Component Interconnect (PCI), and the like. Typically, computer instructions are executed using one or more processors 902 and can be stored in non-volatile storage medium 904 or memory devices 906. Display screen 910 allows results of the computer operations to be displayed to a client or an application developer.

Communication interface 912 allows software and data to be transferred between computing node 900 and external devices. Communication interface 912 may include a modem, a network interface (such as an Ethernet card), a communications port, a PCMCIA slot and card, or the like. Software and data transferred via communication interface 912 may be in the form of signals, which may be electronic, electromagnetic, optical, or other signals capable of being received by communication interface 912. These signals may be provided to communication interface 912 via a communications path. The communications path carries signals and may be implemented using wire or cable, fiber optics, a phone line, a cellular phone link, an RF link or other communications channels. According to an embodiment, a host operating system functionally interconnects any computing device or hardware platform with clients and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the client's computer, partly on the client's computer, as a stand-alone software package, partly on the client's computer and partly on a remote computer or entirely on the remote computer or server. In the latter scenario, the remote computer may be connected to the client's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

What is claimed is:

1. A computer program product comprising:
a non-transitory computer readable storage medium having computer readable program code embodied in the medium, the computer readable program code when executed by a processor causes the processor to perform operations comprising:
communicating with a plurality of nodes for determining network addresses of application resources of the plurality of nodes and capabilities of the application resources;
comparing the capabilities of the application resources to resource needs of a client application;
allocating a plurality of the application resources for use by the client application responsive to the comparison of the capabilities of the application resources to the resource needs of the client application;
combining application keys of the plurality of the application resources that are for use by the client application and that reside on one server to generate a unique identifier for the plurality of the application resources on the one server;
associating the unique identifier for the plurality of the application resources with a network address for the one server;
communicating the unique identifier for the plurality of the application resources to the client application;
receiving a communication from the client application containing the unique identifier;
translating the unique identifier to the network address for the one server; and
forwarding the communication to the network address for the one server.

2. The computer program product of claim 1, wherein the operations further comprise:
receiving capability update messages from at least some of the application resources; and
removing one of the application resources from a repository listing available application resources responsive to not receiving a capability update message from the one of the application resources for at least a threshold time since a last receipt of a capability update message from the one of the application resources.

3. The computer program product of claim 2, wherein the operations further comprise:
defining a duration of the threshold time for the one of the application resources based upon an attribute of the capability of the one of the application resources.

4. The computer program product of claim 1, wherein the operations further comprise:
receiving capability update messages from each of the application resources;
identifying a change in capabilities of one of the application resources responsive to the capability update messages; and
updating application capability information residing in a repository responsive to the identified change in capabilities of the one of the application resources.

5. The computer program product of claim 1, wherein the operations further comprise:
repetitively querying each of the plurality of nodes to determine capabilities of the application resources; and
updating application capability information residing in a repository responsive to changes determined in the capabilities of the application resources.

6. The computer program product of claim 1, wherein the communicating with the plurality of nodes to determine network addresses of the application resources of the plurality of nodes and capabilities of the application resources, comprises:
sending a multicast domain name system multicast query message to the nodes.

7. The computer program product of claim 1, wherein the operations further comprise:
broadcasting information identifying network addresses of application resources and capabilities of the application resources.

8. The computer program product of claim 1, wherein the operations further comprise:
identifying a loss of availability of one of the nodes having an application resource used by the client application;
triggering instantiation of the application resource on another one of the nodes responsive to identifying the loss of availability of the one of the nodes;
associating an application key for the application resource to a network address for said another one of the nodes;
receiving another communication from the client application containing the application key;
translating the application key to the network address for said another one of the nodes; and
forwarding the another communication to the network address for said another one of the nodes.

9. The computer program product of claim 1, wherein the operations further comprise:
identifying a loss of availability of one of the application resources used by the client application; and
associating the application key for another application resource that is available for use to the network address for the one server, responsive to identifying the loss of availability of the one of the nodes.

10. The computer program product of claim 9, wherein the associating the application key for another application resource that is available for use to the network address for the one server, comprises:
comparing the capabilities of the another application resource to capabilities of the one of the application resources that was lost; and selecting the another application resource for substitution for the one of the application resources that was lost responsive to the comparison of the another application resource to the capabilities of the one of the application resources that was lost.

11. The computer program product of claim 1, wherein the operations further comprise:
monitoring quality of service metrics for the application resources used by the client application; and
responding to a quality of service metric for one of the application resources not satisfying a threshold level by associating the application key for another application resource having a quality of service metric that satisfies the threshold level to a to the network address for the one server.

12. The computer program product of claim 11, wherein the operations further comprise:
determining the quality of service metrics for the application resources based on response latencies of the application resources.

13. The computer program product of claim 11, wherein the operations further comprise:
determining the quality of service metrics for the application resources based on occurrence of execution errors with the application resources.

14. The computer program product of claim 1, wherein the operations further comprise:
discovering a node that has become available for use by the client application; and
loading an agent containing a copy of the computer program product onto the node that is newly available.

15. The computer program product of claim 14, wherein the operations further comprise:
forming a client interface for outputting information to a client interface and receiving information from the client interface.

16. The computer program product of claim 1, wherein a plurality of the nodes comprise virtual machines operating under a virtual hypervisor.

17. A network node comprising:
a processor; and
a memory coupled to the processor and comprising computer readable program code that when executed by the processor causes the processor to perform operations to:
communicate with a plurality of nodes to determine network addresses of application resources of the plurality of nodes and capabilities of the application resources;
compare the capabilities of the application resources to resource needs of a client application;
allocate a plurality of the application resources for use by the client application responsive to the comparison of the capabilities of the application resources to the resource needs of the client application;
combine application keys of the plurality of the application resources that are for use by the client application and that reside on one server to generate a unique identifier for the plurality of the application resources on the one server;
associate the unique identifier for the plurality of the application resources with a network address for the one server;
communicate the unique identifier for the plurality of the application resources to the client application;
receive a communication from the client application containing the unique identifier;
translate the unique identifier to the network address for the one server; and
forward the communication to the network address for the one server.

18. A method comprising:
performing operations as follows on a processor of a network node:
communicating with a plurality of nodes to determine network addresses of application resources of the plurality of nodes and capabilities of the application resources;
comparing the capabilities of the application resources to resource needs of a client application;
allocating a plurality of the application resources for use by the client application responsive to the comparison of the capabilities of the application resources to the resource needs of the client application;
combining application keys of the plurality of the application resources that are for use by the client application and that reside on one server to generate a unique identifier for the plurality of the application resources on the one server;
associating the unique identifier for the plurality of the application resources with a network address for the one server;
communicating the unique identifier for the plurality of the application resources to the client application;
receiving a communication from the client application containing the unique identifier;
translating the unique identifier to the network address for the one server; and
forwarding the communication to the network address for the one server.

19. The method of claim 18, the operations further comprising:
identifying a loss of availability of one of the application resources used by the client application;
comparing the capabilities of the one of the application resources to capabilities of the other application resources;
selecting one of the other application resources for use by the client application responsive to the comparison of the capabilities of the one of the application resources to capabilities of the other application resources; and
associating an application key for the selected one of the other application resources to the network address for the one server.

20. The method of claim 18, the operations further comprising:
receiving capability update messages from the application resources; and
removing one of the application resources from a repository listing available application resources responsive to not receiving a capability update message from the one of the application resources for at least a threshold time since a last receipt of a capability update message from the one of the application resources.

21. The method of claim 18, the operations further comprising:
monitoring quality of service metrics for the application resources used by the client application; and
responding to a quality of service metric for one of the application resources not satisfying a threshold level by associating the application key for another application resource having a quality of service metric that satisfies the threshold level to the network address for the one server.

22. The method of claim 18, the operations further comprising:

identifying loss of availability of one of the nodes having an application resource used by the client application;
causing instantiation of the application resource on another one of the nodes responsive to identifying the loss of availability of the one of the nodes; and
associating an application key for the application resource to a network address for said another one of the nodes;
receiving another communication from the client application containing the application key;
translating the application key to the network address for said another one of the nodes; and
forwarding the another communication to the network address for said another one of the nodes.

* * * * *